US012585689B1

(12) United States Patent
Eaton et al.

(10) Patent No.: US 12,585,689 B1
(45) Date of Patent: Mar. 24, 2026

(54) MULTI-LAYERED METHOD OF PREFILTERING AND RANKING FOR TEXT BASED VECTOR RETRIEVAL

(71) Applicant: Dell Products L.P., Round Rock, TX (US)

(72) Inventors: Matthew Eaton, Mansfield, MA (US); Shyam Singaraju, Westborough, MA (US); Anil Koluguri, Durham, NC (US); David Sydow, Merrimack, NH (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/075,163

(22) Filed: Mar. 10, 2025

(51) Int. Cl.
$G06F\ 16/355$ (2025.01)
$G06F\ 16/334$ (2025.01)

(52) U.S. Cl.
CPC ........ G06F 16/355 (2019.01); G06F 16/3347 (2019.01)

(58) Field of Classification Search
CPC .. G06F 16/355; G06F 16/3347; G06F 16/285; G06Q 30/0242; G06Q 10/0633; G06Q 10/06311

(Continued)

(56) References Cited

U.S. PATENT DOCUMENTS 10,003,560 B1 * 6/2018 Perkins ................ H04L 51/216
2015/0332157 A1 * 11/2015 Baughman ........... G06F 16/285
706/52

(Continued)

*Primary Examiner* — Md I Uddin
(74) *Attorney, Agent, or Firm* — Krishnendu Gupta; Lesley Leonessa

(57) ABSTRACT

Methods, system, and non-transitory processor-readable storage medium for a text-based vector retrieval system are provided herein. An example method includes generating, by a text-based vector retrieval system, a set of topics $T_x$ for a document set $D_X$, generating for each document $D_N$ a set of topics $T_D$, comparing the set of topics $T_D$ against the set of topics $T_X$ to generate a filtered set of topics $T_{DFinal}$, comparing the topics $T_{DFinal}$ against final topics of all other documents to generate a set $D_{NMatching}$, encoding each document from the document set into a vector database with corresponding $D_{NMatching}$ and $T_{DFinal}$ as metadata, grouping vectors into N search clusters, retrieving N topics from a query string to generate $T_{Query}$ topics, comparing the $T_{Query}$ topics against topics in each cluster to identify matching clusters having R matching topics, and calculating similarity scores for documents in the matching clusters.

18 Claims, 9 Drawing Sheets

(58) Field of Classification Search
USPC ................. 707/738, 748, 776, 803, 999.001,
707/999.003, E17.09; 715/206, 210, 229,
715/234, 255, 256, 763, 853
See application file for complete search history.

(56) References Cited

U.S. PATENT DOCUMENTS

| | | | | |
|---|---|---|---|---|
| 2018/0067910 A1* | 3/2018 | Alonso | ................... | G06F 16/36 |
| 2018/0293607 A1* | 10/2018 | Huddleston | ........ | G06Q 30/0242 |
| 2023/0061289 A1* | 3/2023 | Paredes | ............. | G06Q 30/0201 |
| 2023/0320642 A1* | 10/2023 | Lin | ........................ | G06F 40/30 |
| 2024/0005244 A1* | 1/2024 | Vangala | ............. | G06Q 10/0633 |

* cited by examiner

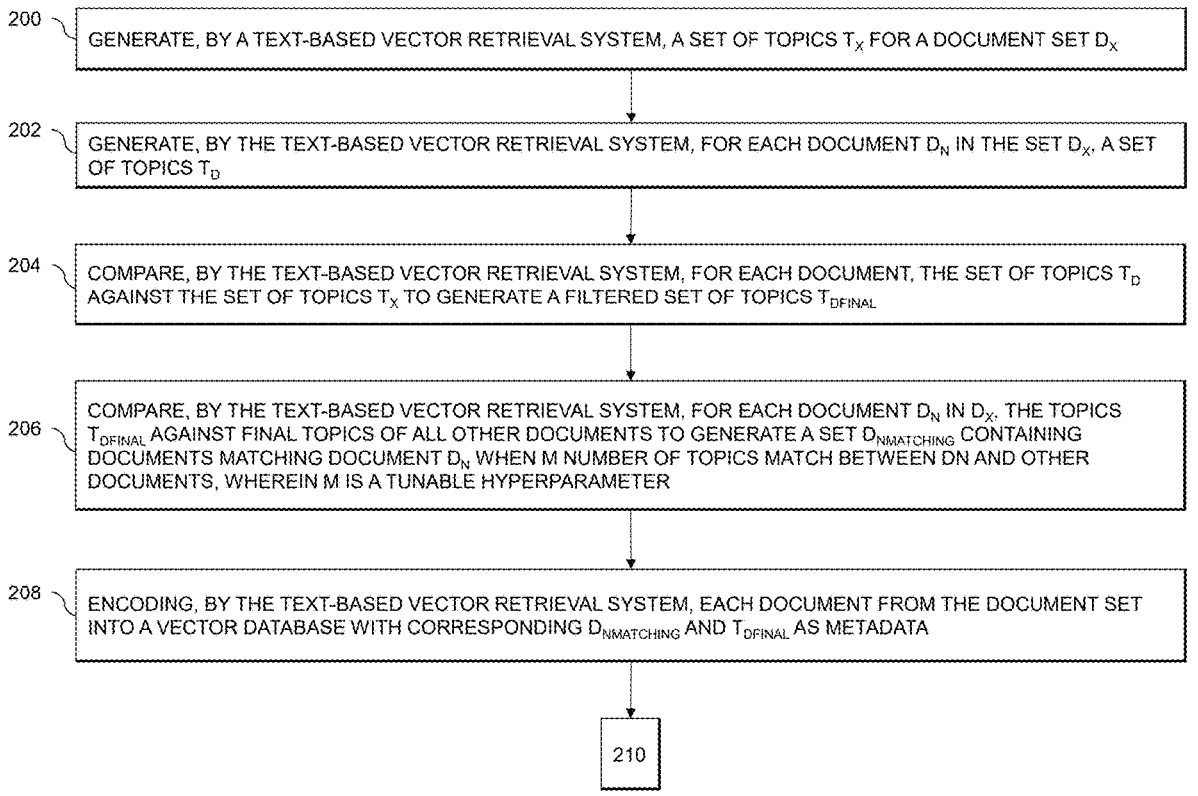

200   GENERATE, BY A TEXT-BASED VECTOR RETRIEVAL SYSTEM, A SET OF TOPICS $T_X$ FOR A DOCUMENT SET $D_X$

202   GENERATE, BY THE TEXT-BASED VECTOR RETRIEVAL SYSTEM, FOR EACH DOCUMENT $D_N$ IN THE SET $D_X$, A SET OF TOPICS $T_D$

204   COMPARE, BY THE TEXT-BASED VECTOR RETRIEVAL SYSTEM, FOR EACH DOCUMENT, THE SET OF TOPICS $T_D$ AGAINST THE SET OF TOPICS $T_X$ TO GENERATE A FILTERED SET OF TOPICS $T_{DFINAL}$

206   COMPARE, BY THE TEXT-BASED VECTOR RETRIEVAL SYSTEM, FOR EACH DOCUMENT $D_N$ IN $D_X$, THE TOPICS $T_{DFINAL}$ AGAINST FINAL TOPICS OF ALL OTHER DOCUMENTS TO GENERATE A SET $D_{NMATCHING}$ CONTAINING DOCUMENTS MATCHING DOCUMENT $D_N$ WHEN M NUMBER OF TOPICS MATCH BETWEEN DN AND OTHER DOCUMENTS, WHEREIN M IS A TUNABLE HYPERPARAMETER

208   ENCODING, BY THE TEXT-BASED VECTOR RETRIEVAL SYSTEM, EACH DOCUMENT FROM THE DOCUMENT SET INTO A VECTOR DATABASE WITH CORRESPONDING $D_{NMATCHING}$ AND $T_{DFINAL}$ AS METADATA

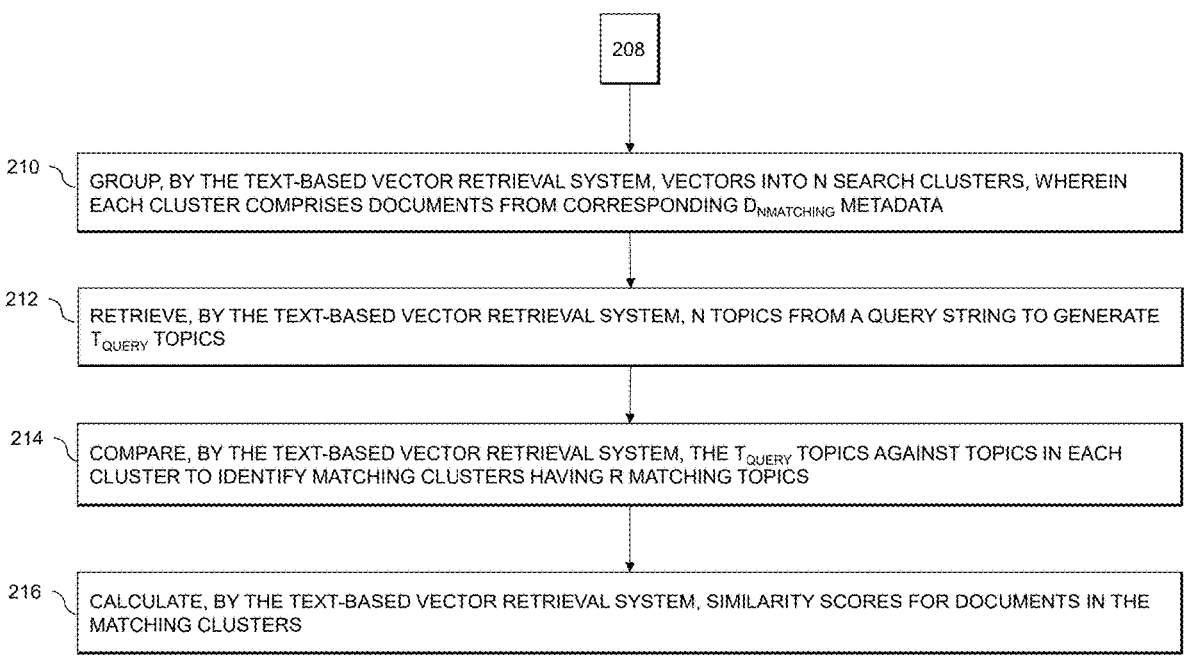

208

210 — GROUP, BY THE TEXT-BASED VECTOR RETRIEVAL SYSTEM, VECTORS INTO N SEARCH CLUSTERS, WHEREIN EACH CLUSTER COMPRISES DOCUMENTS FROM CORRESPONDING $D_{NMATCHING}$ METADATA

212 — RETRIEVE, BY THE TEXT-BASED VECTOR RETRIEVAL SYSTEM, N TOPICS FROM A QUERY STRING TO GENERATE $T_{QUERY}$ TOPICS

214 — COMPARE, BY THE TEXT-BASED VECTOR RETRIEVAL SYSTEM, THE $T_{QUERY}$ TOPICS AGAINST TOPICS IN EACH CLUSTER TO IDENTIFY MATCHING CLUSTERS HAVING R MATCHING TOPICS

216 — CALCULATE, BY THE TEXT-BASED VECTOR RETRIEVAL SYSTEM, SIMILARITY SCORES FOR DOCUMENTS IN THE MATCHING CLUSTERS

FIG. 2 (Continued)

Documents

Topics

Clusters

Search Query

Query Topics

Clusters

Documents

Similarity
Comparison

Similarity Score

Search Query

Query Topics

Clusters

Cluster Weights

Documents

Initial Similarity
Score

Final Similarity
Score 710-1            710-2                    710-L            700

APPS            APPS                     APPS 702-1    VM AND/OR    VM AND/OR    702-2    VM AND/OR    702-L
         CONTAINER    CONTAINER            CONTAINER
         SET 1        SET 2     . . .      SET L

704    VIRTUALIZATION INFRASTRUCTURE

705    PHYSICAL INFRASTRUCTURE

MULTI-LAYERED METHOD OF PREFILTERING AND RANKING FOR TEXT BASED VECTOR RETRIEVAL

FIELD

The field relates generally to pre-filtering Retrieval-Augmented Generation (RAG) techniques, within information processing systems.

BACKGROUND

As large language models (LLMs) become more widely applicable for information retrieval, RAG systems have become more common methods for both zero shot, and multi-shot question answering.

SUMMARY

Illustrative embodiments provide techniques for implementing a text-based vector retrieval system in a storage system. For example, illustrative embodiments comprise generating, by a text-based vector retrieval system, a set of topics $T_{X1}$ for a document set $D_X$. The text-based vector retrieval system generates for each document $D_N$ in the set $D_X$, a set of topics $T_D$. The text-based vector retrieval system compares, for each document, the set of topics $T_D$ against the set of topics $T_X$ to generate a filtered set of topics $T_{DFinal}$. The text-based vector retrieval system compares, for each document $D_N$ in $D_X$, the topics $T_{DFinal}$ against final topics of all other documents to generate a set $D_{NMatching}$ containing documents matching document $D_N$ when M number of topics match between $D_N$ and other documents, where M is a tunable hyperparameter. The text-based vector retrieval system encodes each document from the document set into a vector database with corresponding $D_{NMatching}$ and $T_{DFinal}$ as metadata. The text-based vector retrieval system groups vectors into N search clusters, where each cluster comprises documents from corresponding $D_{NMatching}$ metadata. The text-based vector retrieval system retrieves N topics from a query string to generate $T_{Query}$ topics. The text-based vector retrieval system compares the $T_{Query}$ topics against topics in each cluster to identify matching clusters having R matching topics. The text-based vector retrieval system calculates similarity scores for documents in the matching clusters. Other types of processing devices can be used in other embodiments. These and other illustrative embodiments include, without limitation, apparatus, systems, methods and processor-readable storage media.

BRIEF DESCRIPTION OF THE DRAWINGS

FIG. 2 shows a flow diagram of a process for a text-based vector retrieval system, in an illustrative embodiment.

DETAILED DESCRIPTION

Figure 1:
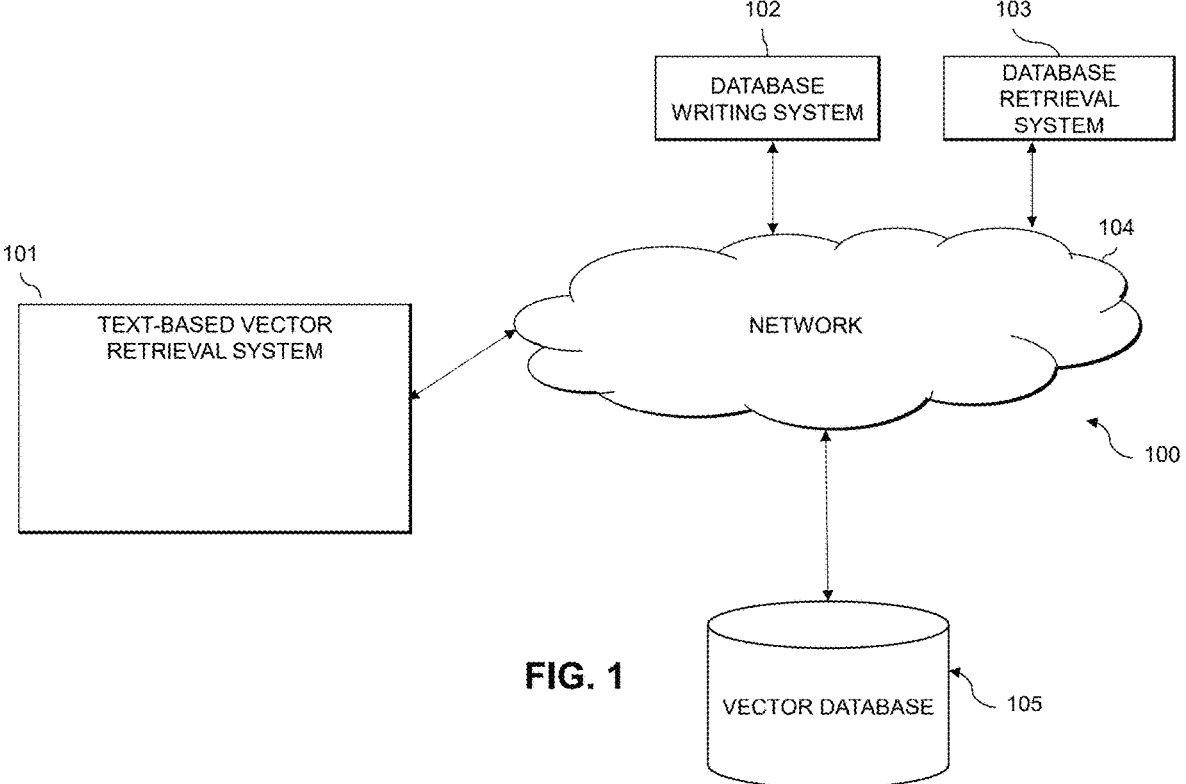
FIG. 1 shows an information processing system including a text-based vector retrieval system, in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Described below is a technique for use in implementing a text-based vector retrieval system, which technique may be used to weight topic modeling to be used in conjunction with vector database metadata to pre-filter text articles prior to vector database retrieval. The text-based vector retrieval system generates a set of topics $T_x$ for a document set $D_X$. The text-based vector retrieval system generates for each document $D_N$ in the set $D_X$, a set of topics $T_D$. The text-based vector retrieval system compares, for each document, the set of topics $T_D$ against the set of topics $T_X$ to generate a filtered set of topics $T_{DFinal}$. The text-based vector retrieval system compares, for each document $D_N$ in $D_X$, the topics $T_{DFinal}$ against final topics of all other documents to generate a set $D_{NMatching}$ containing documents matching document $D_N$ when M number of topics match between $D_N$ and other documents, where M is a tunable hyperparameter. The text-based vector retrieval system encodes each document from the document set into a vector database with corresponding $D_{NMatching}$ and $T_{DFinal}$ as metadata. The text-based vector retrieval system groups vectors into N search clusters, where each cluster comprises documents from corresponding $D_{NMatching}$ metadata. The text-based vector retrieval system retrieves N topics from a query string to generate $T_{Query}$ topics. The text-based vector retrieval system compares the $T_{Query}$ topics against topics in each cluster to identify matching clusters having R matching topics. The text-based vector retrieval system calculates similarity scores for documents in the matching clusters, where the method is performed by at least one processing device comprising a processor coupled to a memory. Other types of processing devices can be used in other embodiments. These and other illustrative embodiments include, without limitation, apparatus, systems, methods and processor-readable storage media.

Conventional technologies utilize re-ranking systems that retrieve an initial set of documents using quick embedding retrieval methods then then use slower embedding methods to retrieve from a smaller set of documents. Conventional technologies rely on the accuracy of embedding models and can be compute intensive. Conventional technologies lack the capability to explain selections. Conventional technologies for pre-filtering techniques to help with RAG retrieval in large documents sets utilize re-ranking and use LLMs to generate semantically similar questions that come at a heavy CPU cost and cause the data ingestion process of a large RAG system to become unwieldy. Conventional technologies fail to provide a computationally efficient method that can be used in both RAG systems and any vector database retrieval. Conventional technologies rely on specific vector search techniques such as Hierarchical Navigable Small World (HNSW), scalar quantization (SQ), product quantization (PQ), etc. which can vary between vector databases and have their own specific limitations.

By contrast, in at least some implementations in accordance with the current technique as described herein, weighted topic modeling is used in conjunction with vector database metadata to pre-filter text articles prior to vector database retrieval by a text-based vector retrieval system that generates a set of topics $T_x$ for a document set $D_X$. The text-based vector retrieval system generates for each document $D_N$ in the set $D_X$, a set of topics $T_D$. The text-based vector retrieval system compares, for each document, the set of topics $T_D$ against the set of topics $T_X$ to generate a filtered set of topics $T_{DFinal}$. The text-based vector retrieval system compares, for each document $D_N$ in $D_X$, the topics $T_{DFinal}$ against final topics of all other documents to generate a set $D_{NMatching}$ containing documents matching document $D_N$ when M number of topics match between $D_N$ and other documents, where M is a tunable hyperparameter. The text-based vector retrieval system encodes each document from the document set into a vector database with corresponding $D_{NMatching}$ and $T_{DFinal}$ as metadata. The text-based vector retrieval system groups vectors into N search clusters, where each cluster comprises documents from corresponding $D_{NMatching}$ metadata. The text-based vector retrieval system retrieves N topics from a query string to generate $T_{Query}$ topics. The text-based vector retrieval system compares the $T_{Query}$ topics against topics in each cluster to identify matching clusters having R matching topics. The text-based vector retrieval system calculates similarity scores for documents in the matching clusters. Other types of processing devices can be used in other embodiments. These and other illustrative embodiments include, without limitation, apparatus, systems, methods and processor-readable storage media.

Thus, a goal of the current technique is to provide a method and a system for a text-based vector retrieval system that can be used to weight and generate metadata for a vector-based retrieval system using topic modeling, and to provide the subsequent retrieval process that utilizes the metadata for vector-based retrieval. Another goal is to provide a system that utilizes a set of text-based metadata to pre-filter and re-rank a set of embeddings, providing a more computationally efficient system than existing models, that is not reliant on a potentially vector-database specific search algorithm, and provides better capabilities for explainability, by utilizing matching topics. Another goal is to create a list of vectorized document clusters and corresponding metadata. Yet another goal is to provide a computationally efficient method that can be used in both RAG systems and any vector database retrieval.

In at least some implementations in accordance with the current technique described herein, the use of a text-based vector retrieval system can provide one or more of the following advantages: prefilters a vectorized search query to match a cluster of vectorized documents, weights the similarity of a vectorized search query to a set of multiple vectorized document clusters, and provides more tunable hyperparameters than traditional models, allowing for better control of recall vs. accuracy rate.

In contrast to conventional technologies, in at least some implementations in accordance with the current technique as described herein, weighted topic modeling used in conjunction with vector database metadata to pre-filter text articles prior to vector database retrieval is achieved by a text-based vector retrieval system that generates a set of topics $T_x$ for a document set $D_X$. The text-based vector retrieval system generates for each document $D_N$ in the set $D_X$, a set of topics $T_D$. The text-based vector retrieval system compares, for each document, the set of topics $T_D$ against the set of topics $T_X$ to generate a filtered set of topics $T_{DFinal}$. The text-based vector retrieval system compares, for each document $D_N$ in $D_X$, the topics $T_{DFinal}$ against final topics of all other documents to generate a set $D_{NMatching}$ containing documents matching document $D_N$ when M number of topics match between $D_N$ and other documents, where M is a tunable hyperparameter. The text-based vector retrieval system encodes each document from the document set into a vector database with corresponding $D_{NMatching}$ and $T_{DFinal}$ as metadata. The text-based vector retrieval system groups vectors into N search clusters, where each cluster comprises documents from corresponding $D_{NMatching}$ metadata. The text-based vector retrieval system retrieves N topics from a query string to generate $T_{Query}$ topics. The text-based vector retrieval system compares the $T_{Query}$ topics against topics in each cluster to identify matching clusters having R matching topics. The text-based vector retrieval system calculates similarity scores for documents in the matching clusters. Other types of processing devices can be used in other embodiments. These and other illustrative embodiments include, without limitation, apparatus, systems, methods and processor-readable storage media.

In an example embodiment of the current technique, the set of topics $T_X$ is generated using Latent Dirichlet Allocation (LDA).

In an example embodiment of the current technique, the text-based vector retrieval system assigns weights to each topic using the LDA algorithm.

In an example embodiment of the current technique, the number of topics in the set of topics $T_X$ is between a total number of documents in set $D_X$ and N times the number of documents in $D_X$, where N is a tunable hyperparameter.

In an example embodiment of the current technique, N is the tunable hyperparameter controlling the number of topics retrieved from the query string.

In an example embodiment of the current technique, the text-based vector retrieval system performs an N×N topic comparison between documents.

In an example embodiment of the current technique, the text-based vector retrieval system removes topics that match between $T_D$ and $T_X$ and exceed a threshold value V to create $T_{DFinal}$.

In an example embodiment of the current technique, the threshold value V controls filtering of common topics across the document set, where a higher V value allows more common topics to be retained.

In an example embodiment of the current technique, R is a tunable hyperparameter controlling the minimum number of matching topics required between a document cluster and query topics.

In an example embodiment of the current technique, each chunk entry includes the corresponding $D_{NMatching}$ and $T_{DFinal}$ metadata.

In an example embodiment of the current technique, each search cluster contains a union of topics from all documents in the corresponding $D_{NMatching}$ list.

In an example embodiment of the current technique, the text-based vector retrieval system encodes each document using GTE-Large encoding.

In an example embodiment of the current technique, the text-based vector retrieval system adds filtered document topics as metadata to the vector database.

In an example embodiment of the current technique, the text-based vector retrieval system determines a cluster weight $T_{ClusterWeight}$ based on matching topics, calculates a vector similarity score $V_{MatchValue}$ between the query and documents, and computes a final similarity score $D_{Similarity}$ as a product of $T_{ClusterWeight}$ and $V_{MatchValue}$.

In an example embodiment of the current technique, the text-based vector retrieval system uses a ratio of matching topics to total query topics.

In an example embodiment of the current technique, $V_{MatchValue}$ is calculated using cosine similarity between the query and documents.

In an example embodiment of the current technique, the cosine similarity provides values between 0.0 and 1.0, with 1.0 indicating an exact match and 0.0 indicating highly disparate.

In an example embodiment of the current technique, $D_{Similarity}$ represents the final similarity score between a search query and a specific document in a document cluster.

In an example embodiment of the current technique, the text-based vector retrieval system receives the document set $D_X$ from a database writing system that writes data to the vector database.

In an example embodiment of the current technique, the text-based vector retrieval system transmits data from the vector database to a database retrieval system.

FIG. 1 shows a computer network (also referred to herein as an information processing system) 100 configured in accordance with an illustrative embodiment. The computer network 100 comprises a text-based vector retrieval system 101, a database writing system 102, a database retrieval system 103, and a vector database 105. The text-based vector retrieval system 101, database writing system 102, database retrieval system 103, and vector database 105 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. The text-based vector retrieval system 101 may reside on a storage system. Such storage systems can comprise any of a variety of different types of storage including network-attached storage (NAS), storage area networks (SANs), direct-attached storage (DAS) and distributed DAS, as well as combinations of these and other storage types, including software-defined storage.

Each of the text-based vector retrieval system 101, database writing system 102, database retrieval system 103, and vector database 105 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The text-based vector retrieval system 101, database writing system 102, database retrieval system 103, and vector database 105 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the text-based vector retrieval system 101 are one or more input-output devices, which illustratively comprise keyboards, displays or other types of input-output devices in any combination. Such input-output devices can be used, for example, to support one or more user interfaces to the text-based vector retrieval system 101, as well as to support communication between the text-based vector retrieval system 101 and other related systems and devices not explicitly shown. For example, a dashboard may be provided for a user to view results produced by the text-based vector retrieval system 101. One or more input-output devices may also be associated with any of the text-based vector retrieval system 101, database writing system 102, database retrieval system 103, and vector database 105.

Additionally, the text-based vector retrieval system 101 in the FIG. 1 embodiment is assumed to be implemented using at least one processing device. Each such processing device generally comprises at least one processor and an associated memory, and implements one or more functional modules for controlling certain features of the text-based vector retrieval system 101.

More particularly, the text-based vector retrieval system 101 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the text-based vector retrieval system 101 to communicate over the network 104 with the text-based vector retrieval system 101, database writing system 102, database retrieval system 103, and vector database 105 and illustratively comprises one or more conventional transceivers.

A text-based vector retrieval system 101 may be implemented at least in part in the form of software that is stored in memory and executed by a processor, and may reside in any processing device. The text-based vector retrieval system 101 may be a standalone plugin that may be included within a processing device.

It is to be understood that the particular set of elements shown in FIG. 1 for text-based vector retrieval system 101 involving the text-based vector retrieval system 101, database writing system 102, database retrieval system 103, and vector database 105 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the text-based vector retrieval system 101 can be on and/or part of the same processing platform.

An exemplary process of text-based vector retrieval system 101 in computer network 100 will be described in more detail with reference to, for example, the flow diagram of FIG. 2.

FIG. 2 is a flow diagram of a process for execution of the text-based vector retrieval system 101 in an illustrative embodiment. It is to be understood that this particular process is only an example, and additional or alternative processes can be carried out in other embodiments.

At 200, the text-based vector retrieval system 101 generates a set of topics $T_x$ for a document set $D_X$. In an example embodiment, the text-based vector retrieval system 101 receives the document set $D_X$ from a database writing system 102 that writes data to the vector database 105. In another example embodiment, the text-based vector retrieval system 101 transmits data from the vector database 105 to a database retrieval system 103.

In an example embodiment, the set of topics $T_X$ is generated using Latent Dirichlet Allocation (LDA). In an example embodiment, for a given set of documents $D_X$, the number of topics in the set of topics $T_X$ is between a total number of documents in set $D_X$ and N times the number of documents in $D_X$, where N is a tunable hyperparameter. In other words, the number of topics is no more than N times the number of documents in $D_X$, and the number of topics is no less than the total number of documents in the set $D_X$. In an example embodiment, N is a tunable hyperparameter controlling the number of topics retrieved from the query string.

In an example embodiment, the text-based vector retrieval system 101 assigns weights to each topic using the LDA algorithm. For example, $D_X$ is a set of Books={Jungle Book, Moby Dick, Star Wars} and $T_X$ is a set of topics with weights={Animal: 0.9, Bear: 0.3, Alien: 0.2}

At 202, the text-based vector retrieval system 101 generates for each document $D_N$ in the set $D_X$, a set of topics $T_D$. In an example embodiment, the number of topics is no more than the tunable hyperparameter N. For example, $D_X$ is a set of Books={Jungle Book, Moby Dick, Star Wars}, with "Jungle Book" represented by $D_N$, and $T_D$ a set of Jungle Book Topics={Animal}.

At 204, for each document, the text-based vector retrieval system 101 compares the set of topics $T_D$ against the set of topics $T_X$ to generate a filtered set of topics $T_{DFinal}$. If the topic in TX matches a topic in TD, and that topic is also above a hyperparameter V, the topic is removed from the set TD. This allows topics common across the entire document set to be filtered out, as they have less meaning when searching for potential matches than uncommon topics. In an example embodiment, the threshold value V controls filtering of common topics across the document set, where a higher V value allows more common topics to be retained. Therefore, a higher level of V generates pre-filtering that includes more common topics, providing more false positives, but allows for higher recall.

For example, Book $D_N$, "Jungle Book" has the following set of topics $T_D$={Animal, Bear}. If hyperparameter V is 0.5, the set $T_D$ will be reduced to {Bear}, as "Animal" has a weight of 0.9 in $T_X$, as noted above.

Figure 3:
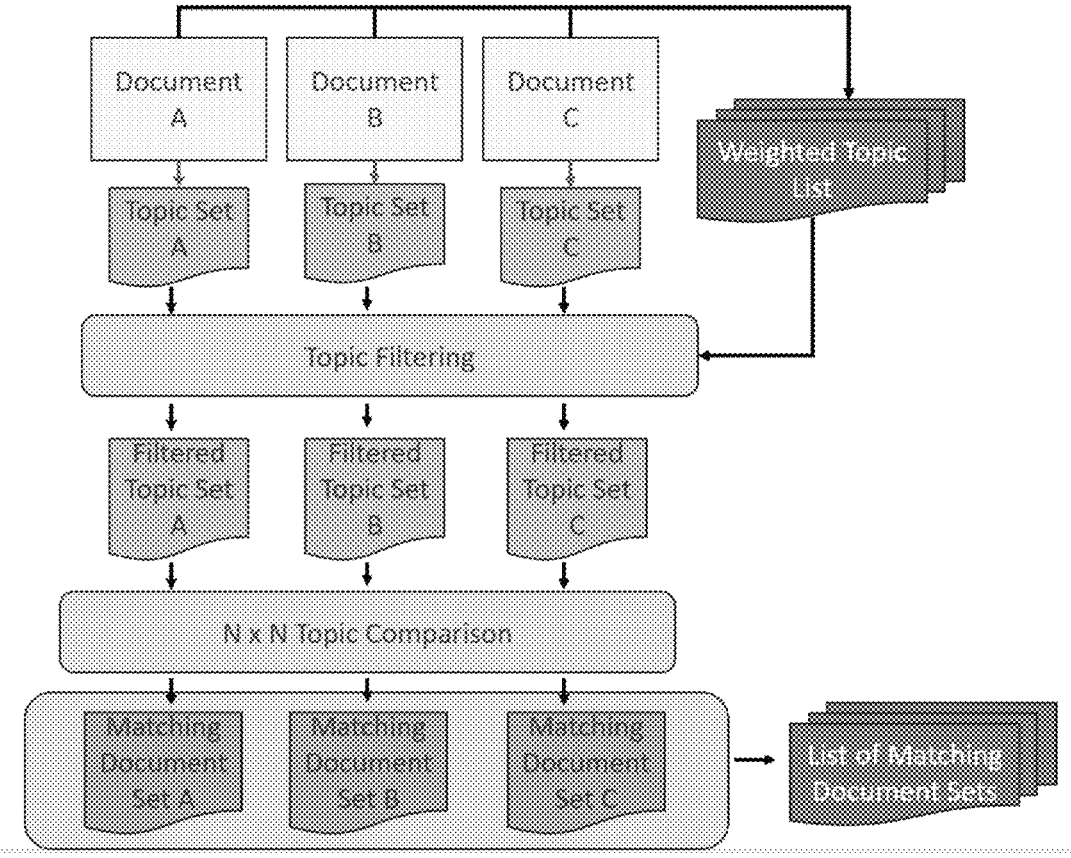
FIG. 3 illustrates a topic modeling diagram, in an illustrative embodiment.

At 206, for each document $D_N$ in $D_X$, the text-based vector retrieval system 101 compares the topics $T_{DFinal}$ against final topics of all other documents to generate a set $D_{NMatching}$ containing documents matching document $D_N$ when M number of topics match between $D_N$ and other documents. In an example embodiment, the text-based vector retrieval system 101 performs an N×N topic comparison between documents as illustrated in FIG. 3. FIG. 3 illustrates a topic modeling diagram. In an example embodiment, M is a tunable hyperparameter. In other words, for each document $D_N$ in $D_X$, the topics $T_{DFinal}$ are compared against the final topics of all other documents in the set. If M number of topics between $D_N$ and $D_{N+1}$, a set $D_{Matching}$ is generated. The set $D_{Matching}$ contains a set of documents matching a given document $D_N$.

For example, given three documents with M=1, D1, D2, D3 with topic sets $T_{D1Final}$={Animal, Cat}, $T_{D2Final}$={Animal, Dog}, and $T_{D3Final}$={Cooking}, $D_{1Matching}$ for D1={D2}, $D_{Matching}$ for TD2={TD1}, and $D_{Matching}$ for TD3={empty}. The final output of the text-based vector retrieval system 101 is a list of sets, with each item in the list representing a document, and its corresponding set of matching documents, based by topic. For example, using the results above, the corresponding list is following:

D1,{D2}
D2,{D1}
D3,{empty})

At 208, the text-based vector retrieval system 101 encodes each document from the document set into a vector database 105 with corresponding $D_{NMatching}$ and $T_{DFinal}$ as metadata. In an example embodiment, the text-based vector retrieval system 101 encodes each document using GTE-Large encoding. The results for $D_{NMatching}$ for each topic $D_N$ are added as metadata to the vector database 105, along with the corresponding filtered document topics, represented as $T_{DFinal}$. In an example embodiment, if DN is chunked into multiple entries each chunk entry includes the corresponding $D_{NMatching}$ and $T_{DFinal}$ metadata. In an example embodiment, the text-based vector retrieval system 101 adds filtered document topics as metadata to the vector database 105.

At 210, during the data retrieval process, the text-based vector retrieval system 101 groups the vectors into N search clusters, where each cluster comprises documents from corresponding $D_{NMatching}$ metadata. In an example embodiment, the text-based vector retrieval system 101 generates each search cluster. For each document $D_N$ that is represented in the vector database 105, the text-based vector retrieval system 101 adds the document to a search cluster, consisting of all documents in the corresponding $D_{NMatching}$ metadata. In an example embodiment, each search cluster contains a union of topics from all documents in the corresponding $D_{NMatching}$ list. For example, if the corresponding $D_{NMatching}$ list is as follows:

D1,{D2}

D2,{D1}

D3,{empty})

Then the subsequent search clusters are 2 search clusters:

Cluster #1→{D1, D2}

Cluster #2→{D3}

Figure 4:
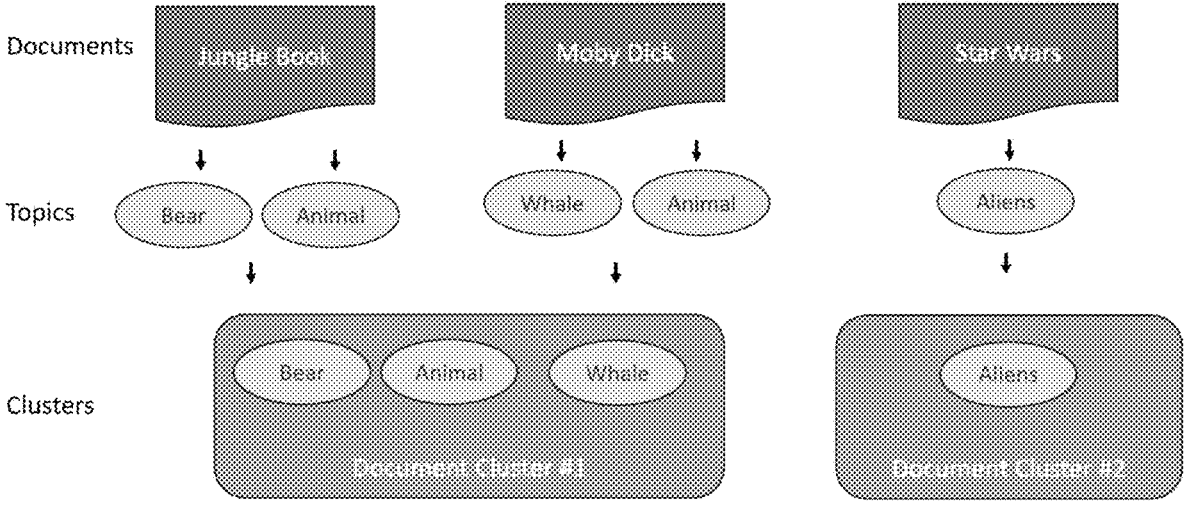
FIG. 4 illustrates the output of the document clustering, in an illustrative embodiment.

FIG. 4 illustrates the output of the document clustering.

At 212, the text-based vector retrieval system 101 retrieves, N topics from a query string to generate $T_{Query}$ topics. In an example embodiment, N is a tunable hyperparameter.

Figure 5:
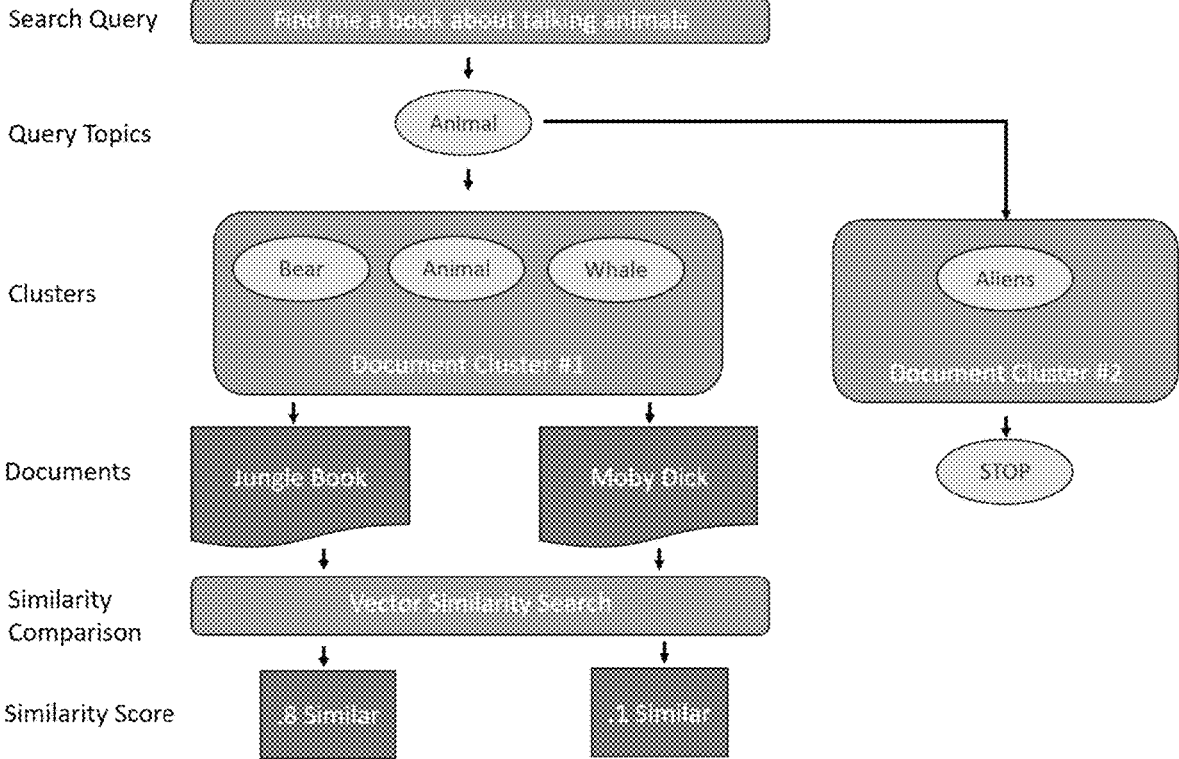
FIG. 5 illustrates document retrieval for a single cluster match, in an illustrative embodiment.

At 214, the text-based vector retrieval system 101 compares the $T_{Query}$ topics against topics in each cluster to identify matching clusters having R matching topics. If there are R number of matching topics between the document cluster, represented as $T_{DocCluster}$, and the query string topic $T_{Query}$, then the text-based vector retrieval system 101 performs a vector similarity comparison with the top X documents from the cluster retrieved. In an example embodiment, X and R are both tunable hyperparameter. The tunable hyperparameter R is a tunable hyperparameter controlling the minimum number of matching topics required between a document cluster and query topics. FIG. 5 illustrates document retrieval for a single cluster match.

At 216, the text-based vector retrieval system 101 calculates similarity scores for documents in the matching clusters. In an example embodiment, in the case that multiple document clusters match the topics in $T_{Query}$, X documents are retrieved from the combined cluster. The total number of topics in all matching clusters are represented as $N_{TotalTopics}$. The total number of topics that match between $T_{Query}$ topics and each document cluster are represented as $T_{ClusterMatch}$. A cluster similarity is assigned to each document cluster, having a unique value of $T_{ClusterWeight}$, and is calculated using the formula:

$$T_{ClusterWeight} = \frac{T_{Query}}{T_{ClusterMatch}}$$

The text-based vector retrieval system 101 determines the cluster weight $T_{ClusterWeight}$ based on matching topics. In an example embodiment, the text-based vector retrieval system 101 uses a ratio of matching topics to total query topics. In an example embodiment, the text-based vector retrieval system 101 calculates a vector similarity score $V_{MatchValue}$ between the query and documents. In an example embodiment, the text-based vector retrieval system 101 calculates $V_{MatchValue}$ using cosine similarity between the query and documents. In an example embodiment, the cosine similarity provides values between 0.0 and 1.0, with 1.0 indicating an exact match and 0.0 indicating highly disparate. In an example embodiment, other techniques may be used to determine similarity between multidimensional vectors, for example, Jaccard similarity, dot product, Euclidean distance, Levenshtein distance, etc.

In an example embodiment, the text-based vector retrieval system 101 computes a final similarity score $D_{Similarity}$ as a product of $T_{ClusterWeight}$ and $V_{MatchValue}$, where $D_{Similarity}$ represents the final similarity score between a search query and a specific document in a document cluster. The overall weighted similarity score between a document and a query is computed as follows:

$$Similarity = T_{ClusterWeight} * V_{MatchValue} * D_{Similarity}$$

Figure 6:
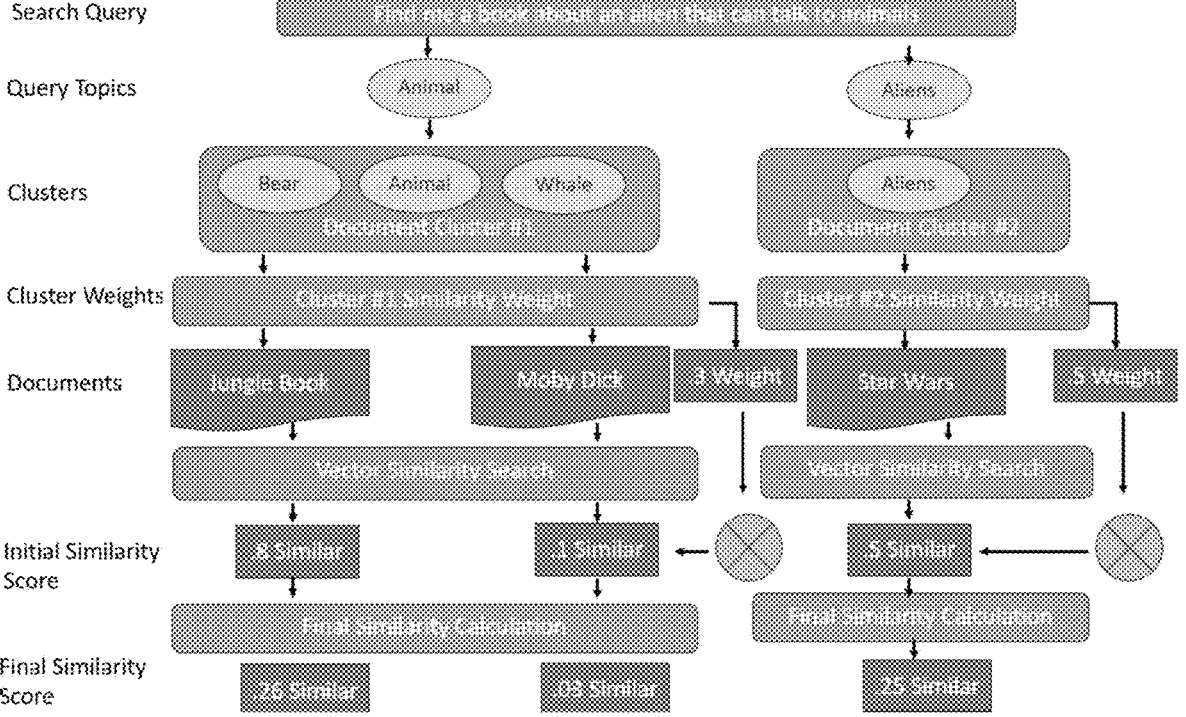
FIG. 6 illustrates the similarity calculation across multiple document clusters, in an illustrative embodiment.

FIG. 6 illustrates the similarity calculation across multiple document clusters.

The above-described illustrative embodiments provide significant advantages relative to conventional approaches. For example, some embodiments are configured to provide a computationally efficient method that can be used in both RAG systems and any vector database retrieval. These and other embodiments can effectively improve computationally efficient RAG pre-filtering techniques to support large data sets. Embodiments disclosed herein use weighted topic modeling in conjunction with vector database metadata to pre-filter text articles prior to vector database retrieval. Embodiments disclosed herein provide a system that utilizes a set of text-based metadata to pre-filter and re-rank a set of embeddings, providing a more computationally efficient system than existing models, a system that is not reliant on a potentially vector-database specific search algorithms, and provides better capabilities for explainability, by utilizing matching topics. Embodiments disclosed herein provide more tunable hyperparameters than traditional models, allowing for better control of recall vs. accuracy rate.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the information processing system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of the information processing system 100, these platforms may also be used to implement at least portions of other information processing systems in other embodiments.

Figure 7:
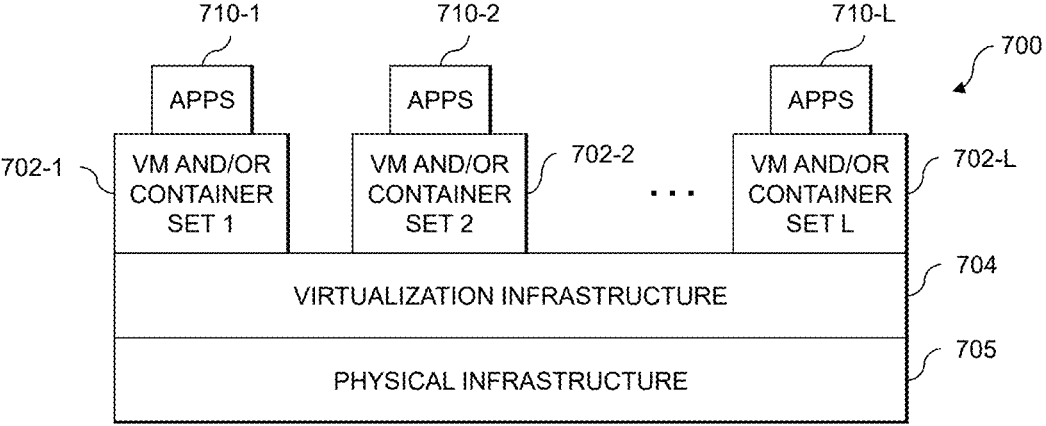
FIGS. 7 and 8 show examples of processing platforms that may be utilized to implement at least a portion of a text-based vector retrieval system embodiments.
Figure 8:
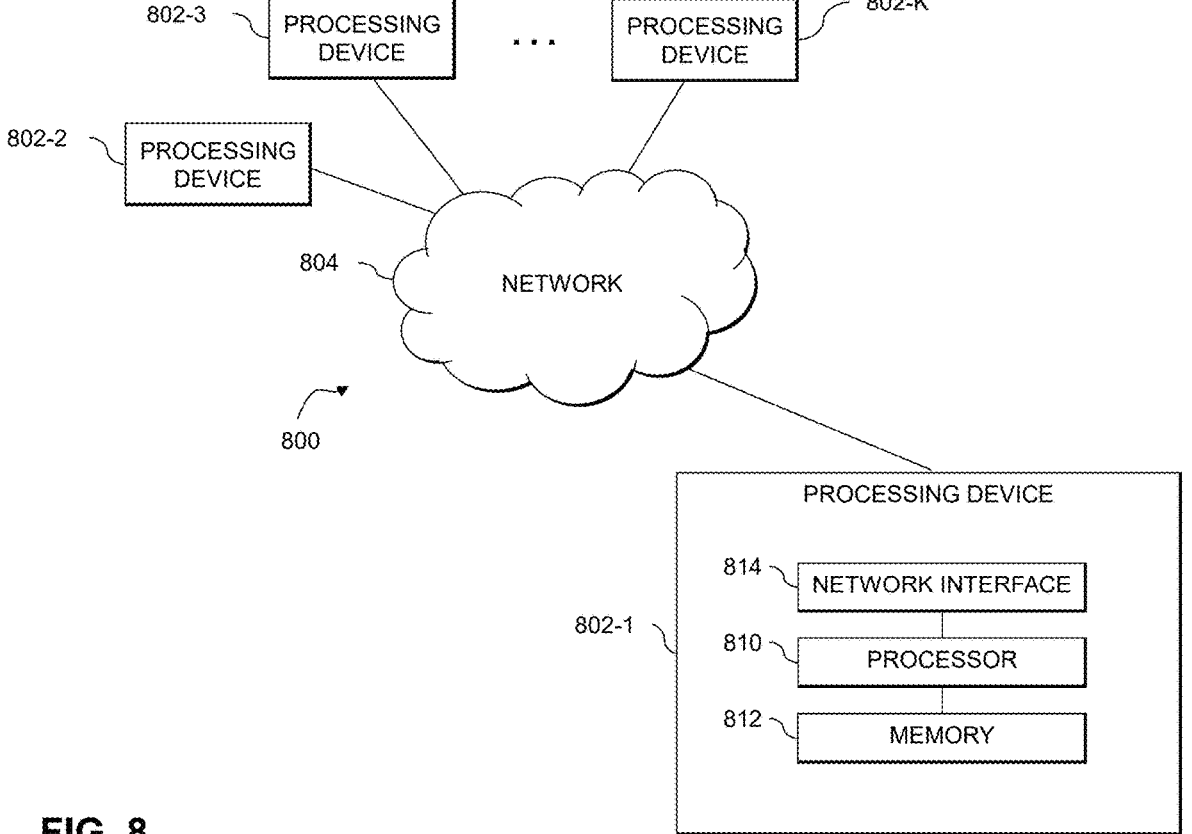

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, where the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of the information processing system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 1000 in this embodiment comprises a portion of the information processing system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an application-specific integrated circuit (ASIC), a field-programmable gate array (FPGA) or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method for text-based vector retrieval, comprising:
generating, by a text-based vector retrieval system, a set of topics $T_x$ for a document set $D_X$;
generating, by the text-based vector retrieval system, for each document $D_N$ in the set $D_X$, a set of topics $T_D$;
comparing, by the text-based vector retrieval system, for each document, the set of topics $T_D$ against the set of topics $T_X$ to generate a filtered set of topics $T_{DFinal}$;
comparing, by the text-based vector retrieval system, for each document $D_N$ in $D_X$, the topics $T_{DFinal}$ against final topics of all other documents to generate a set $D_{NMatching}$ containing documents matching document $D_N$ when M number of topics match between $D_N$ and other documents, wherein M is a tunable hyperparameter;
encoding, by the text-based vector retrieval system, each document from the document set into a vector database with corresponding $D_{NMatching}$ and $T_{DFinal}$ as metadata;
grouping, by the text-based vector retrieval system, vectors into N search clusters, wherein each cluster comprises documents from corresponding $D_{NMatching}$ metadata;
retrieving, by the text-based vector retrieval system, N topics from a query string to generate $T_{Query}$ topics;

comparing, by the text-based vector retrieval system, the $T_{Query}$ topics against topics in each cluster to identify matching clusters having R matching topics; and
calculating, by the text-based vector retrieval system, similarity scores for documents in the matching clusters, wherein the method is performed by at least one processing device comprising a processor coupled to a memory;
wherein calculating, by the text-based vector retrieval system, similarity scores for documents in the matching clusters comprises:
determining a cluster weight $T_{ClusterWeight}$ based on matching topics;
calculating a vector similarity score $V_{MatchValue}$ between the query and documents, and
computing a final similarity score $D_{Similarity}$ as a product of $T_{ClusterWeight}$ and $V_{MatchValue}$, wherein $D_{Similarity}$ represents the final similarity score between a search query and a specific document in a document cluster.

2. The method of claim 1 wherein the set of topics $T_X$ is generated using Latent Dirichlet Allocation (LDA).

3. The method of claim 2 wherein generating, by the text-based vector retrieval system, the set of topics $T_X$ comprises:
assigning weights to each topic using the LDA algorithm.

4. The method of claim 1 wherein a number of topics in the set of topics $T_X$ is between a total number of documents in set $D_X$ and N times the number of documents in $D_X$, where N is a tunable hyperparameter.

5. The method of claim 4 wherein N is the tunable hyperparameter controlling the number of topics retrieved from the query string.

6. The method of claim 1 wherein comparing, by the text-based vector retrieval system, for each document, the set of topics $T_D$ against the set of topics $T_X$ comprises:
performing an N×N topic comparison between documents.

7. The method of claim 1 wherein comparing, by the text-based vector retrieval system, for each document, the set of topics $T_D$ against the set of topics $T_X$ comprises:
removing topics that match between $T_D$ and $T_X$ and exceed a threshold value V to create $T_{DFinal}$.

8. The method of claim 7 wherein the threshold value V controls filtering of common topics across the document set, wherein a higher V value allows more common topics to be retained.

9. The method of claim 1 wherein R is a tunable hyperparameter controlling the minimum number of matching topics required between a document cluster and query topics.

10. The method of claim 1 wherein for chunked documents, each chunk entry includes the corresponding $D_{NMatching}$ and $T_{DFinal}$ metadata.

11. The method of claim 1 wherein each search cluster contains a union of topics from all documents in the corresponding $D_{NMatching}$ list.

12. The method of claim 1 further comprising adding filtered document topics as metadata to the vector database.

13. The method of claim 1 wherein determining the cluster weight $T_{ClusterWeight}$ comprises:
using a ratio of matching topics to total query topics.

14. The method of claim 1 wherein $V_{MatchValue}$ is calculated using cosine similarity between the query and documents.

15. The method of claim 14 wherein the cosine similarity provides values between 0.0 and 1.0, with 1.0 indicating an exact match and 0.0 indicating highly disparate.

16. The method of claim 1 wherein the text-based vector retrieval system receives the document set $D_X$ from a database writing system that writes data to the vector database.

17. A system comprising:

at least one processing device comprising a processor coupled to a memory;

the at least one processing device being configured:

to generate, by a text-based vector retrieval system, a set of topics $T_X$ for a document set $D_X$;

to generate, by the text-based vector retrieval system, for each document $D_N$ in the set $D_X$, a set of topics $T_D$;

to compare, by the text-based vector retrieval system, for each document, the set of topics $T_D$ against the set of topics $T_X$ to generate a filtered set of topics $T_{DFinal}$;

to compare, by the text-based vector retrieval system, for each document $D_N$ in $D_X$, the topics $T_{DFinal}$ against final topics of all other documents to generate a set $D_{NMatching}$ containing documents matching document $D_N$ when M number of topics match between $D_N$ and other documents, wherein M is a tunable hyperparameter;

to encode, by the text-based vector retrieval system, each document from the document set into a vector database with corresponding $D_{NMatching}$ and $T_{DFinal}$ as metadata;

to group, by the text-based vector retrieval system, vectors into N search clusters, wherein each cluster comprises documents from corresponding $D_{NMatching}$ metadata;

to retrieve, by the text-based vector retrieval system, N topics from a query string to generate $T_{Query}$ topics;

to compare, by the text-based vector retrieval system, the $T_{Query}$ topics against topics in each cluster to identify matching clusters having R matching topics; and to calculate, by the text-based vector retrieval system, similarity scores for documents in the matching clusters;

wherein calculating, by the text-based vector retrieval system, similarity scores for documents in the matching clusters comprises:

determining a cluster weight $T_{ClusterWeight}$ based on matching topics;

calculating a vector similarity score $V_{MatchValue}$ between the query and documents, and computing a final similarity score $D_{Similarity}$ as a product of $T_{ClusterWeight}$ and $V_{MatchValue}$, wherein $D_{Simi}$*larity* represents the final similarity score between a search query and a specific document in a document cluster.

18. A computer program product comprising a non-transitory processor-readable storage medium having stored therein program code of one or more software programs, wherein the program code when executed by at least one processing device causes said at least one processing device:

to generate, by a text-based vector retrieval system, a set of topics $T_X$ for a document set $D_X$;

to generate, by the text-based vector retrieval system, for each document $D_N$ in the set $D_X$, a set of topics $T_D$;

to compare, by the text-based vector retrieval system, for each document, the set of topics $T_D$ against the set of topics $T_X$ to generate a filtered set of topics $T_{DFinal}$;

to compare, by the text-based vector retrieval system, for each document $D_N$ in $D_X$, the topics $T_{DFinal}$ against final topics of all other documents to generate a set $D_{NMatching}$ containing documents matching document $D_N$ when M number of topics match between $D_N$ and other documents, wherein M is a tunable hyperparameter;

to encode, by the text-based vector retrieval system, each document from the document set into a vector database with corresponding $D_{NMatching}$ and $T_{DFinal}$ as metadata;

to group, by the text-based vector retrieval system, vectors into N search clusters, wherein each cluster comprises documents from corresponding $D_{NMatching}$ metadata;

to retrieve, by the text-based vector retrieval system, N topics from a query string to generate $T_{Query}$ topics;

to compare, by the text-based vector retrieval system, the $T_{Query}$ topics against topics in each cluster to identify matching clusters having R matching topics; and to calculate, by the text-based vector retrieval system, similarity scores for documents in the matching clusters;

wherein calculating, by the text-based vector retrieval system, similarity scores for documents in the matching clusters comprises:

determining a cluster weight $T_{ClusterWeight}$ based on matching topics;

calculating a vector similarity score $V_{MatchValue}$ between the query and documents, and computing a final similarity score $D_{Similarity}$ as a product of $T_{ClusterWeight}$ and $V_{MatchValue}$, wherein $D_{Similarity}$ represents the final similarity score between a search query and a specific document in a document cluster.

* * * * *